(12) United States Patent
Yamamoto

(10) Patent No.: US 7,453,842 B2
(45) Date of Patent: Nov. 18, 2008

(54) METHOD AND APPARATUS FOR MOBILE NETWORK

(75) Inventor: Junji Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 668 days.

(21) Appl. No.: 11/011,955

(22) Filed: Dec. 15, 2004

(65) Prior Publication Data

US 2006/0018299 A1   Jan. 26, 2006

(30) Foreign Application Priority Data

Jul. 7, 2004   (JP)   ............... 2004-199998

(51) Int. Cl.
*H04Q 7/00* (2006.01)
*H04Q 7/20* (2006.01)
*H04L 12/28* (2006.01)
*H04L 12/56* (2006.01)

(52) U.S. Cl. ............... 370/328; 370/313; 370/389; 370/392; 455/432.1

(58) Field of Classification Search ............... 370/310, 370/313, 328, 389, 392; 455/432.1
See application file for complete search history.

(56) References Cited

U.S. PATENT DOCUMENTS

| 7,168,090 B2 * | 1/2007 | Leung ............... 726/4 |
| 7,299,044 B2 * | 11/2007 | Ikeda et al. ............... 455/436 |
| 2005/0164729 A1 * | 7/2005 | Narayanan et al. ............ 455/522 |

FOREIGN PATENT DOCUMENTS

WO   WO 03/088615   4/2003

OTHER PUBLICATIONS

D. Johnson et al., "Mobility Support in IPv6", Network Working Group, Standards Track, Jun. 2004, pp. 1-165.

* cited by examiner

*Primary Examiner*—Ronald Abelson
(74) *Attorney, Agent, or Firm*—Reed Smith LLP; Stanley P. Fisher, Esq.; Juan Carlos A. Marquez, Esq.

(57) ABSTRACT

A method and a device to resolve the problem of long communication paths between a mobile node, and a node not supporting mobile IP wherein a plurality of home agents are established in the network and by using the anycast address as the home address, the home agent nearest the communication node or mobile node is selected from among the home addresses.

11 Claims, 10 Drawing Sheets

METHOD AND APPARATUS FOR MOBILE NETWORK

CLAIM OF PRIORITY

The present invention claims priority from Japanese application JP 2004-199998 filed on Jul. 7, 2004, the content of which is hereby incorporated by reference into this application.

FIELD OF THE INVENTION

The present invention relates to a method and a device for controlling a network containing mobile devices.

BACKGROUND OF THE INVENTION

One technology of the related art allowing mobile nodes to utilize an IP network is called Mobile IPv6 (See for example non-patent document 1). Mobile IPv6 utilizes a router called a home agent (hereafter HA) for communications connected to the mobile node (hereafter MN). When the MN receives a care-of address (address the MN borrows from each network location) via an external network, the MN sends that care-of address along with a binding request containing the MN unique address (hereafter home address) to the HA. When a valid binding request is received, the HA registers the MN information in the internal binding cache.

The node communicating with the MN (hereafter CN), utilizes the home address as the destination address during communication with that MN. The HA receives the packet with the home (destination) address. The HA then relays that packet to the care-of address of the MN. The packet is in this way conveyed from the CN to the MN. The CN supports Mobile IPv6, so when the CN can process the binding request sent from the MN, the CN registers and utilizes the home address and matching care-of address within the binding cache of its own node. The CN can therefore optimize the route to directly communicate with the MN without the HA.

[Patent document 1] JP-A No. 007578/2004

[Non-patent document 11] "Mobility Support in IPv6", RFC3775 IETF (Internet Engineering Task Force) Request for Comments.

SUMMARY OF THE INVENTION

When the CN does not support Mobile IPv6 in the related art, this route optimizing function cannot be used. All communication between the CN and MN must be carried out via the HA. The related art in this case has the problem that communication path becomes long.

The technology of the related art for example in patent document 1 utilizes multiple HA. In this technology, the MN measures the distance to the HA (delay, number of hops). If this distance is longer than a standard value, the MN switches the HA, and utilizes the nearest HA in an attempt to shorten the communication path. However, this technology does not contain a method allowing CN that do not support Mobile IPv6 to select an HA. This method therefore has the problem of not being limited to the nearest HA so that the communication path from the CN to the MN was not always the shortest path.

The present invention attempts to eliminate the above problem of long communication paths between mobile nodes and nodes that do not support mobile IP.

One aspect of the present invention is that multiple home agents are established in the network and by using the anycast address as the home address, a nearby home agent is selected from among the multiple home agents. Utilizing these multiple home agents allow selecting the home agent nearest the CN or MN. This method in other words permits selecting the shortest path compared to the case when there is only one home agent. To establish an optimal route, this method, the node (MN) registers HA addresses separately from HA addresses that were already registered.

The anycast address need not be different from the unicast address (regular address) that is shown. The term anycast address here is used for multiple identical addresses within the network. The node itself might actually be only one node but there may be multiple home agents managing the home addresses on different networks so there are multiple home addresses as seen by the other nodes (CN).

In another aspect of the present invention, a first node is connected to the network system via cables or wireless (radio), and contains two addresses including a home address and a care-of address, wherein the network system includes: multiple home agents containing a binding list for managing the matching of the home address with the care-of address, and a master server for managing the matching between the first node, and the home agents containing the binding list used by the first node.

When the second node connected to the network system is accessing the first node, and uses the anycast address as the home address, the packet is sent for example to the nearest home agent (first home agent) by a routing method of the known art. If the first home agent contains a care-of address matching the home address that was sent, then communication exchange begins directly with the node at the communication destination.

On the other hand, when the first home agent does not possess a binding list used by the first node, or in other words when the first home agent is not managing a corresponding care-of address (matching the home address), the first home agent queries the master server about what home agents hold the binding list used by the first node. When results from the query reveal the home agent (second agent) possessing the binding list, the first home agent relays the issued packet to the first node via the second home agent.

At this time, after the first home agent attaches a flag to the packet showing the packet has traveled via the first home agent, the packet may be relayed to the first node via the second home agent. The route for the packet can then be optimized by the first node that received the packet (with flag showing travel via the first home agent) registering the binding list used by the first node into the first home agent. The range of the present invention includes these types of nodes.

In another aspect of the invention, the server is connected to a network system containing nodes utilizing two addresses including a home address and a care-of address, and further containing multiple home agents including a binding list for managing the matching of home addresses with care-of addresses; wherein the server manages the matching between the node and the home agent containing the binding list utilized by the node. This type of server contains an MN-HA link table. Each entry in this MN-HA link table is comprised of information specifying the node, and a list of home agent groups in which node care-of addresses are registered. When this server receives a query from a home agent that was sent a packet from a node that it does not manage, the server replies with the address of a home agent storing the set including the care-of address and the home address of that node.

The server structure includes a packet processor, an interrogator processor, and a memory. The memory stores the MN-HA link table. The packet processor contains a function to shift processing to the interrogator process when it receives a packet query about home agents where the care-of address of the specified node is registered. The interrogator processor searches the list of home agents from the MN-HA link table where the care-of address of the specified node is registered. The interrogator processor contains a function to return a packet containing the list information to the source making the query. Though the entire present invention is applicable, this function may be implemented by dedicated hardware or by software implemented on a CPU.

The aspects of the present invention may also have a structure without the above described server. In this aspect, a control method for mobile networks containing multiple home agents includes: a step for the second home agent to receive a packet addressed to the home address of the mobile node, a step for the second home agent to search for the care-of address matching the mobile node, a step for querying other home agents on whether there is a first home agent managing the mobile node, a step for the second home agent to relay the packet to the first home agent, and a step for the first home agent to relay the packet to the care-of address of the mobile node.

In another aspect of the present invention, the home agent is connected to a network system including a node and a master server, and the home agent includes a binding list for managing the matching of the care-of address with the home address of the node, wherein the home agent further includes a packet processor made up of an interface to an external section, a master server interrogator section for making queries to the master server, and an MN-MS link table for managing the combining of information specifying a node, and information specifying a master server.

This home agent includes a Mobile IP processor to search the binding list to find if there is a care-of address matching the home address of the applicable node when a specified packet was sent from a specified node, and an MS interrogator to search the master server for the specified node from the MN-MS link table when results from searching the binding table show there is no care-of address, and query the searched master server for home agents registered with a care-of address for the specified node.

The present invention is therefore capable of shortening the communication path and reducing network traffic.

DETAILED DESCRIPTION OF THE PREFERRED EMBODIMENTS

First Embodiment

The embodiment of the present invention is described next with reference to the accompanying drawings.

Figure 1:
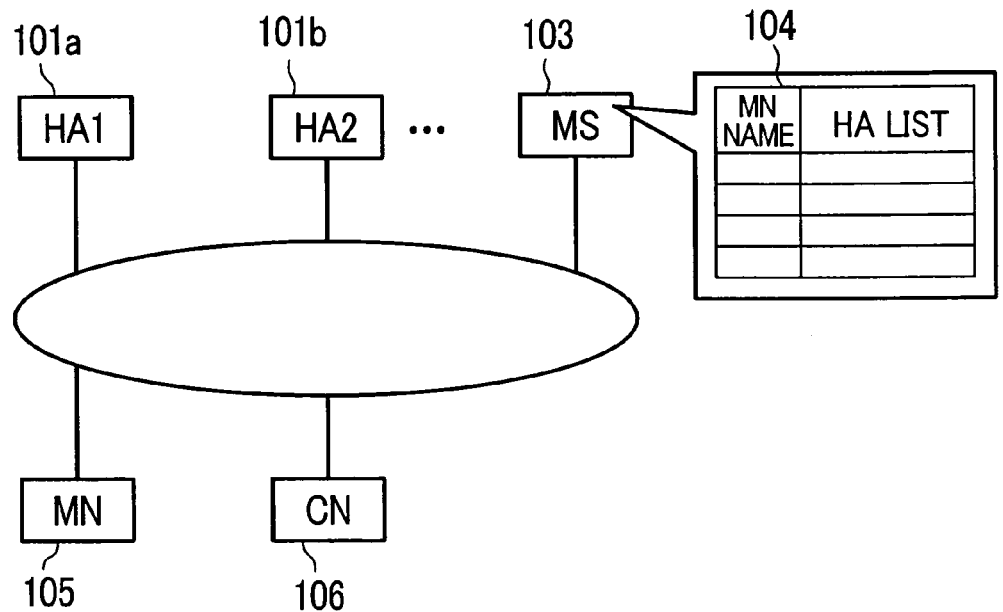
FIG. 1 is a block diagram showing the structure of the system for the embodiment of the present invention.

FIG. 1 shows the structure of the system of the present embodiment. This system is comprised of a Mobile IPv6 compatible node (MN) 105, a home agent (HA) group 101a, 101b for managing the linking of the MN home address (HoA) and the care-of address (CoA) of the MN, a master server (MS) 103 for managing the HA group, and a node (CN) 106 for communicating with the MN. The MS contains a binding list (or MN-HA link table) 104 made up of an HA group holding the MN and the care-of address for that MN. Only two HA, here 101a and 101b are shown on the map for purposes of simplicity. However the number of HA is not limited to two. Only one MS is shown here, however multiple MS may be utilized and for example an MS may be available for every MN.

Figure 2:
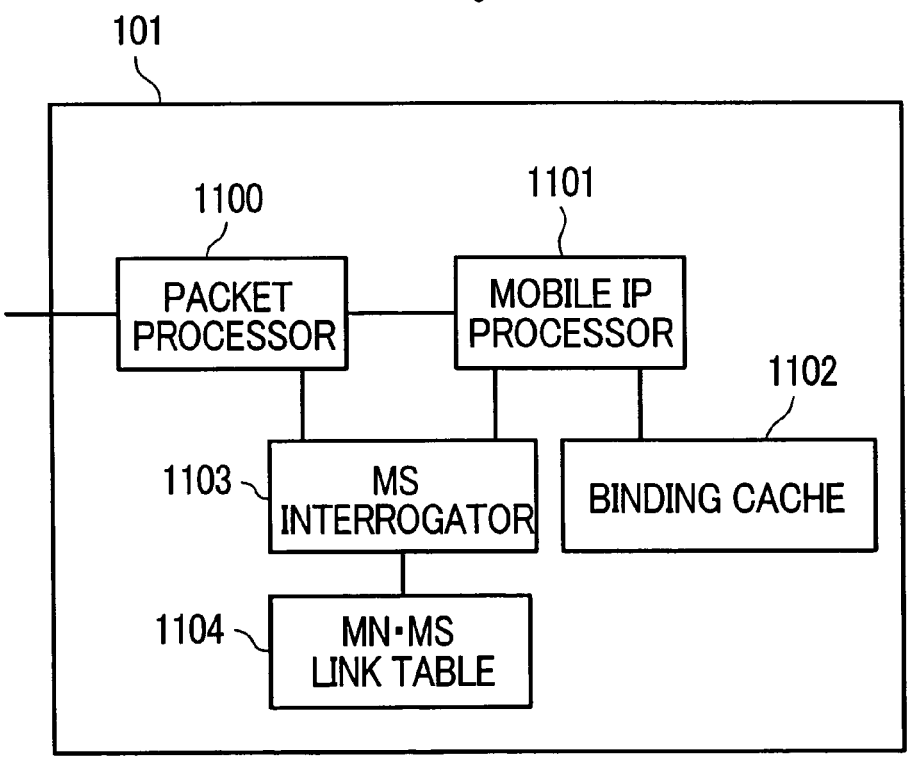
FIG. 2 is a block diagram of the home agent (HA) of the embodiment of the present invention.

FIG. 2 shows a typical structure of an HA. The HA101 contains a packet processor 1100 made of an interface with external sections, a mobile IP processor 1101 for processing the Mobile IP packet, a binding cache 1102 for storing the match or link between the CoA and the HoA of the MN, an MS interrogator 1103 for making queries to the MS, and a binding list 104 to hold the MS address corresponding to the MN.

Figure 3:
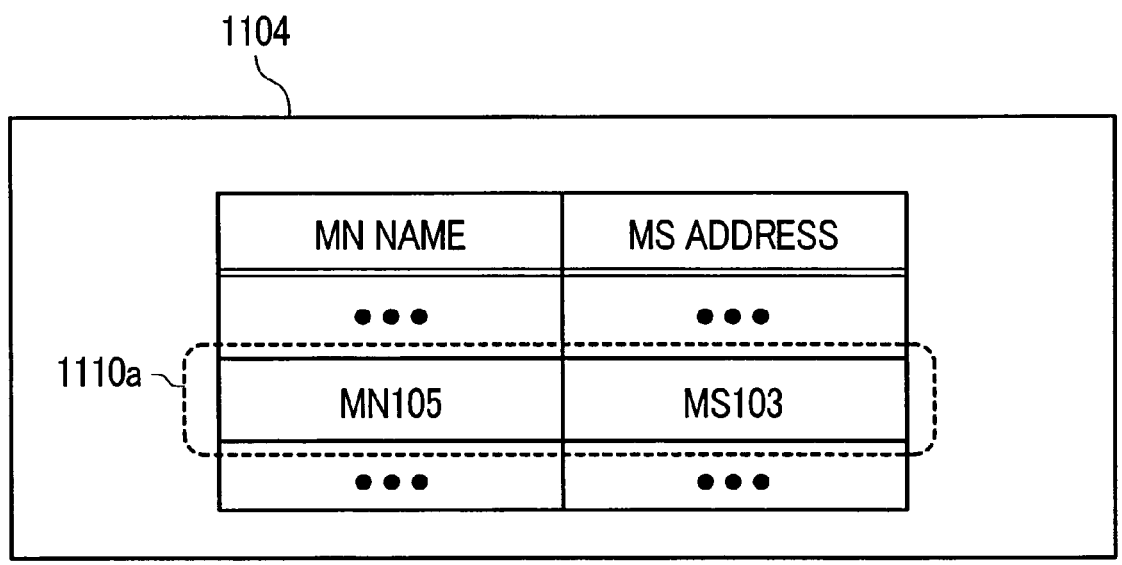
FIG. 3 is a table drawing showing the structure of the MN-MS table.

FIG. 3 is a table drawing showing the structure of the binding list 104. Each entry in the binding list 104 is made of each MN name and the MS address corresponding to that MN name. The entry 1110a for example shows that the MS corresponding to the MN105 is the (MS address) MS103.

In the HA101b, the Mobile IP packet is sent to the Mobile IP processor 1101 via the packet processor 1100. The Mobile IP processor 1101 searches the binding cache 1102. When there is no CoA matching the HoA of the MN105, the Mobile IP processor 1101 shifts the processing to the MS interrogator 1103. The MS interrogator 1103 searches the MN-MS link table 104 for an MS105 corresponding to the MN105. The MS interrogator 1103 makes a query for an HA with a CoA for the MN105 registered in the MS103, and obtains HA101a. The MS interrogator 1103 returns the HA101a as the query result to the Mobile IP processor 1101. The Mobile IP processor 1101 places the packet 301 in the packet 303 and relays it to HA101a via the packet processor 1100. The HA101a loads the packet 303 and the address of HA101b in the packet 304 and sends it to the MN105. The address of HA101b can also here be sent to the MN105 via a packet separate from the packet 304.

Figure 4:
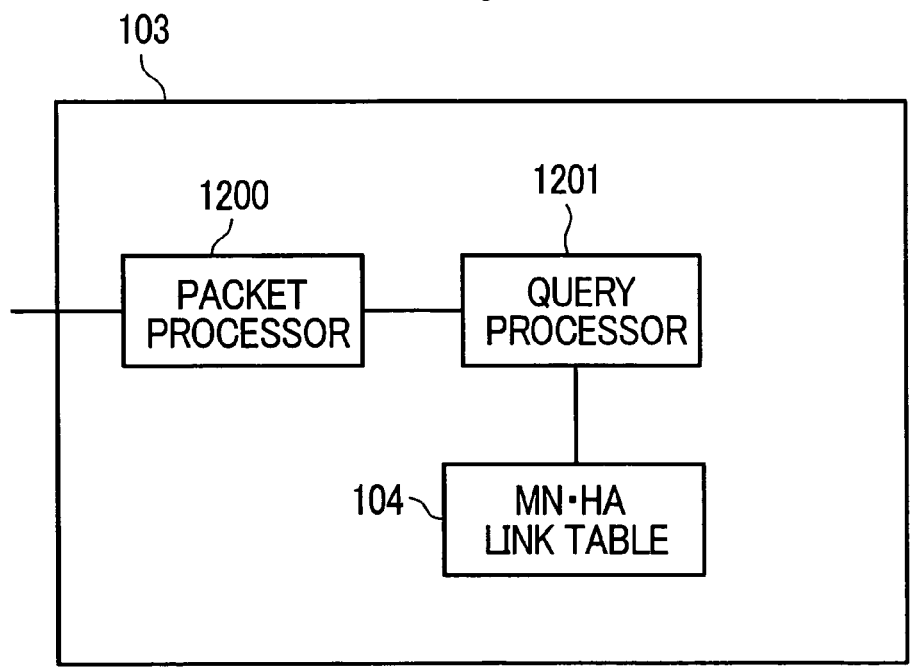
FIG. 4 is a block diagram of the master server (MS) of the embodiment of the present invention.

FIG. 4 is a block diagram showing the structure of the MS. The MS103 contains a packet processor 1200, an interrogator processor 1201 and an MN-HA link table 104.

Figure 5:
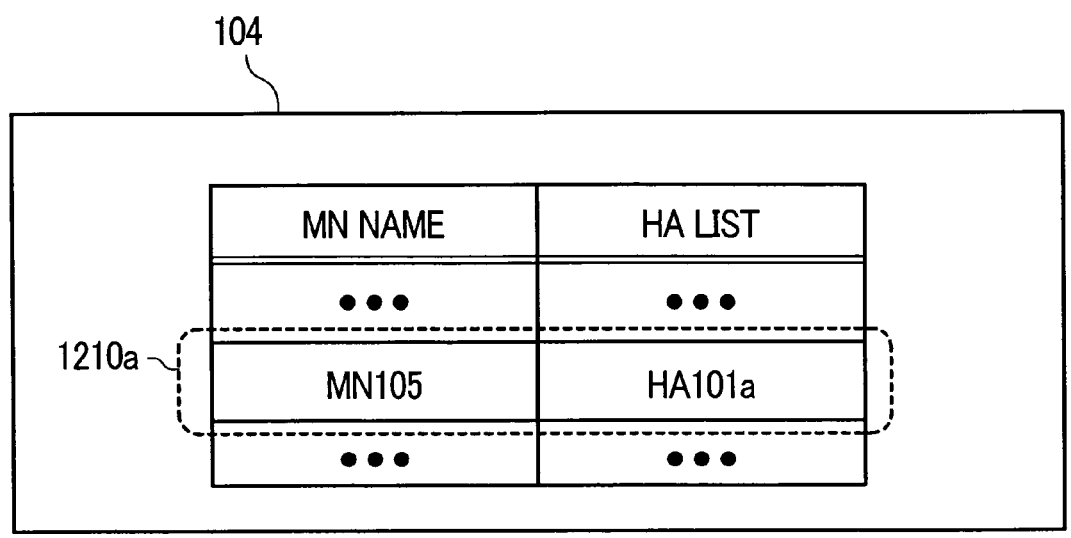
FIG. 5 is table drawing showing the structure of the MN-HA link table.

FIG. 5 shows the structure of the MN-HA link table 104. Each entry of the MN-HA link table 104 is made of each MN name and an HA group list of registered CoA for the MN name. The entry 1210a for example shows that the Ha where the CoA of MN105 is registered is HA101a.

When a packet arrives with a query for HA holding the CoA of MN105, the packet processor 1200 of the MS103 shifts the processing to the interrogator processor 1201. The interrogator processor 1201 searches the MN-HA link table 104 for the list of HA holding the CoA of the MN105, and obtains the entry 1210a. The interrogator processor 1201 returns the packet containing the information for the entry 1210a to the source making the query.

Figure 6:
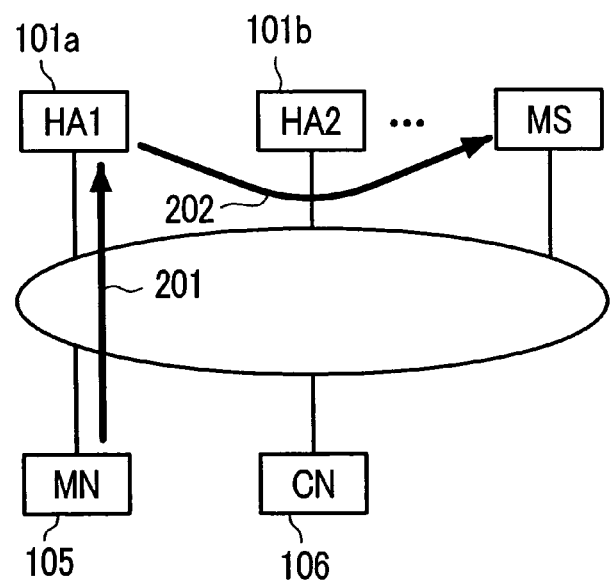
FIG. 6 is a network drawing showing the operation of the MN registering its own care-of address into the HA.

FIG. 6 shows the operation for the MN registering its own care-of address into the HA. The MN105 sends the binding request 201 to the HA101a to register the match between the home address and the care-of address in the HA101a. Along with updating the binding cache list inside its own node, the HA101a sends the registration packet 202, and registers the MN105 and the HA101a in the MN-HA link table of the MS103.

Figure 7:
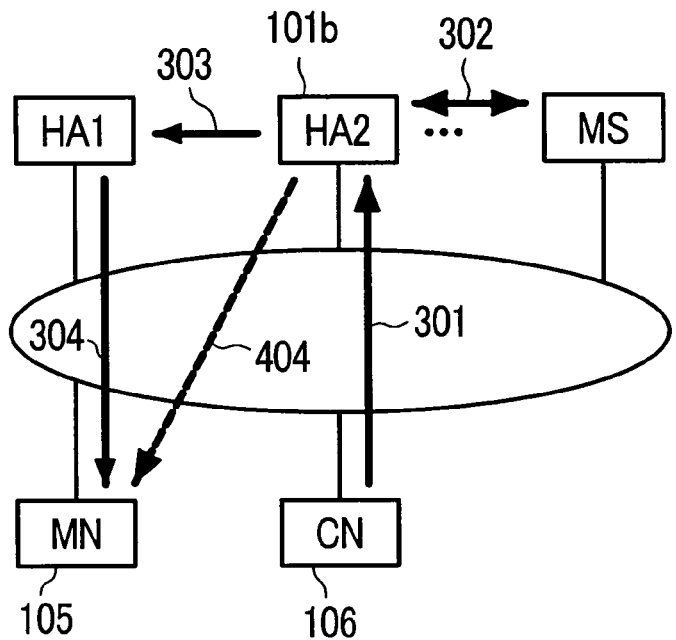
FIG. 7 is a network drawing showing the operation when the CN communicates with the MN.

FIG. 7 shows the operation when the CN is communicating with the MN. The CN106 starts communication with the MN104 by sending a packet 301 to the home address of the MN105. The packet 301 is relayed to a nearby HA101b by a router in the network whose presence is not listed here by registering the routing information using the home address as an anycast address. The anycast address is assigned according to function rather than by node or interface. Moreover, anycast does not transmit to all nodes (interfaces) belonging to a specified group such as in multicast, but instead transmits only to selected node for example the "nearest" node. The definition of the anycast address is defined for example in "Internet Protocol Version 6 (IPv6) Addressing Architecture", rfc 3513, IETF (Internet Engineering Task Force) Request for Comments.

When there is no care-of address for the MN105 in the binding cache within the HA101b, a query is made to the MS103 for an HA where the MN105 care-of address is registered, and the HA101a is obtained. The HA101b loads the packet 301 on the packet 303 and relays it to the HA101a. The HA101a loads the packet 303 and HA101b address onto the packet 304 and sends it to the MN105. The address of the HA101b can also be sent to the MN105 by a packet different from the packet 304.

When there is a care-of address (CoA) for the MN105 registered in the binding cache within the HA101b, the HA101b relays the packet 301 as the packet 404 to the care-of address of MN105.

Figure 8:
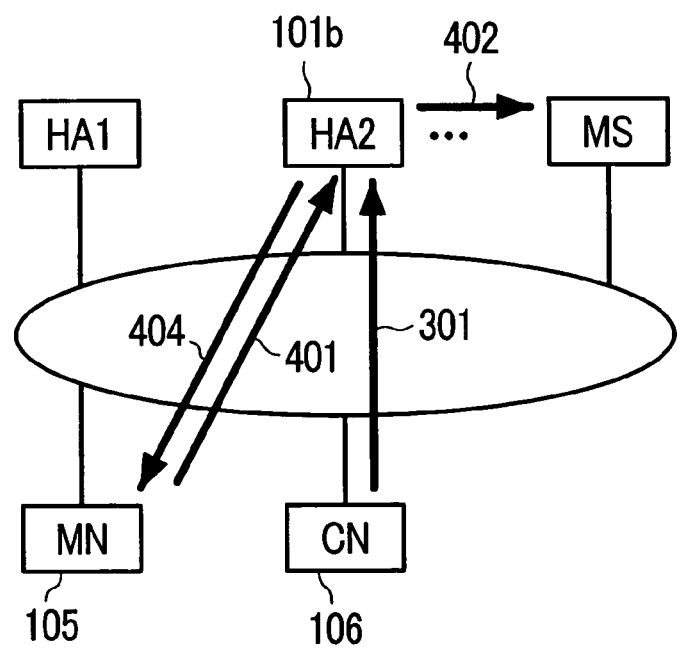
FIG. 8 is a network drawing showing the MN registry operation in the HA101b to optimize the communication route from the CN.

FIG. 8 shows the operation for optimizing the communication router from the CN by the MN registering the HA101b. When an HA101b is relayed that is not registered within its own node, the MN105 also registers this home address and care-of address for this HA101b by using the binding request 401, the same as when registering for the HA101a. The HA101b that received the binding request 401 registers the binding for the MN105 between the home address and the care-of address within the binding cache of its own node. The HA101b also registers the link of the MN105 and HA101b with the binding list 104 in the MN103 using the registration packet 402. The HA101b afterwards returns a binding acknowledgment (not written in the drawings) to the MN105, notifying that registry (binding entry) in the MN105 is complete.

When the packet 301 is received from the CN106 after the HA101b has registered the MN105, the HA101b sends the packet 404 directly to the MN105 based on information in the binding cache within its own node.

Figure 9:
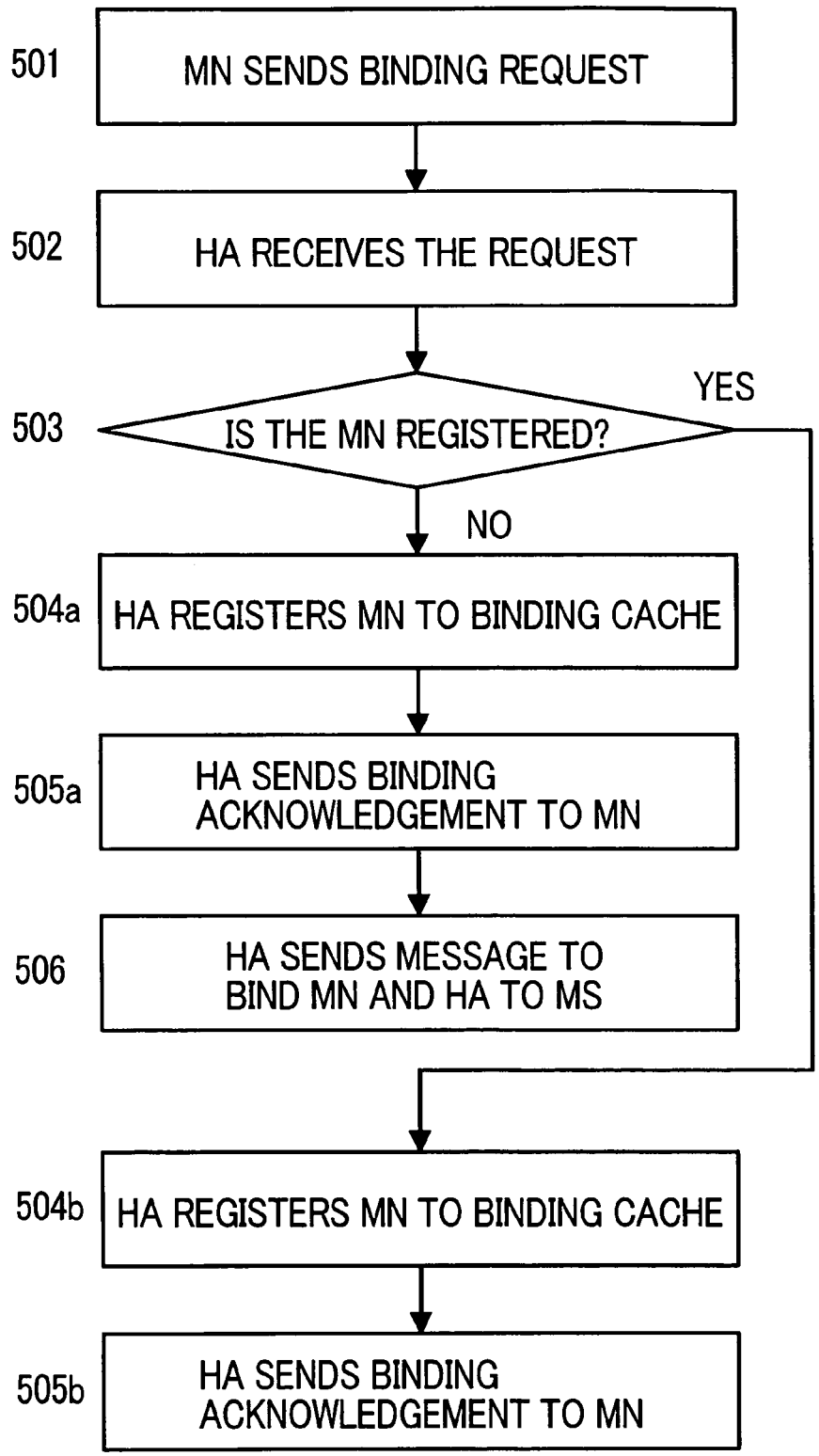
FIG. 9 is a network drawing showing the operation of registering the HA in the MS.

The operation for registering by the HA in the MS is described next while referring to the flow chart in FIG. 9.

In step 501, the MN sends a binding request containing the matching care-of address and home address of its own node, to the HA.

In step 502, when the HA receives the binding request, a check is made in step 503 on whether the MN is registered in the binding cache or not. If registered, then the process shifts to step 504b. If not registered then the process shifts to step 504a.

In step 504a and step 504b, the care-of address and the home address of the MN are registered in the binding cache within the HA. In step 505a and step 505b, a binding acknowledgment is sent to the MN notifying the MN that registration is complete.

In step 506, the HA sends a registration (binding entry) packet to the MS, to register the link between the MN home address and the HA address to the binding list within the MS.

The step 506 can here be executed regardless of the sequence of steps 504a and 505b.

Figure 10:
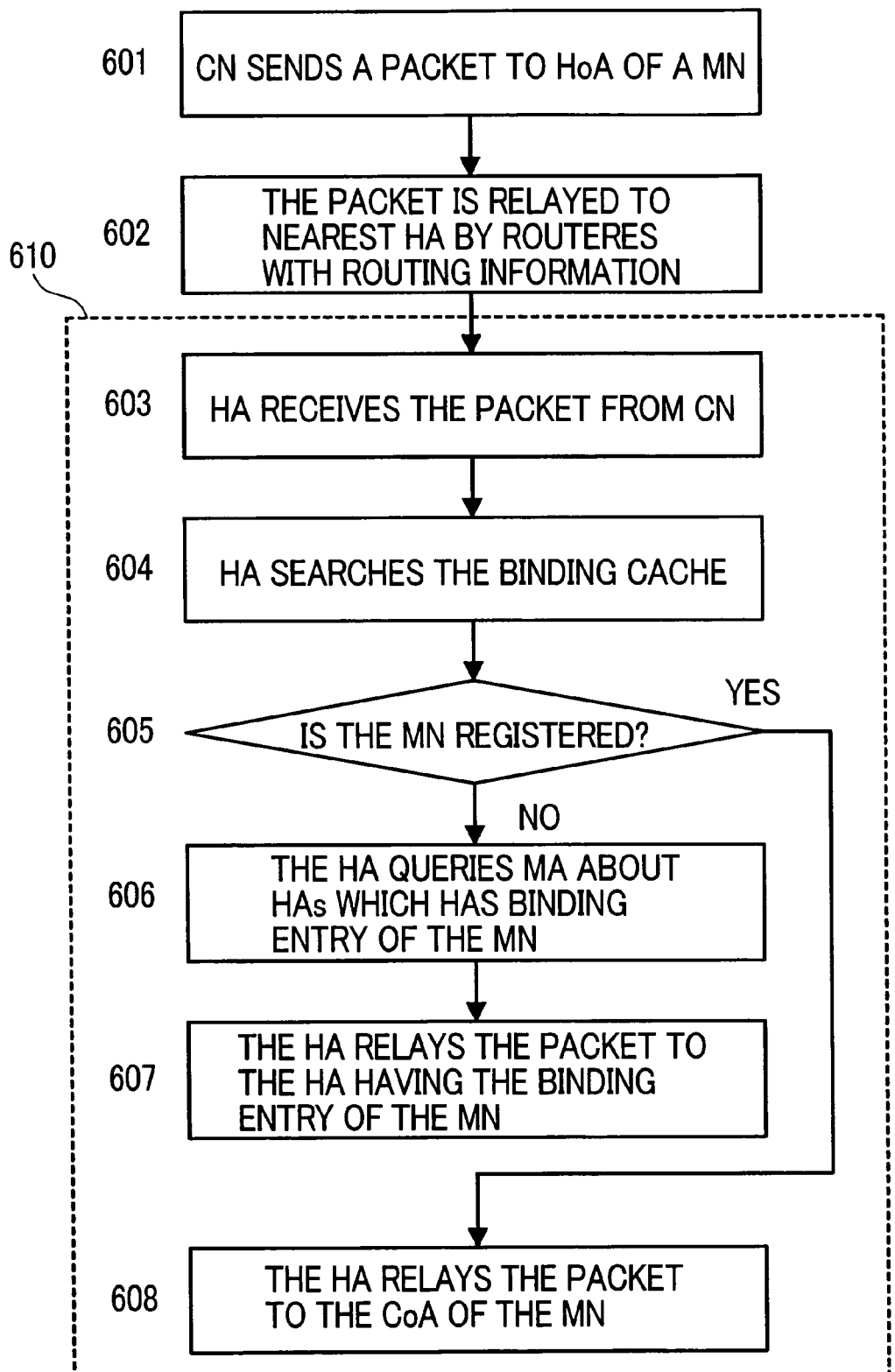
FIG. 10 is a flow chart of the processing of the packet from the HA in the MS.

The processing of the packet from CN in the HA is described next while referring to the flow chart in FIG. 10. Here, the group 610 is the HA processing operation range.

In step 601, when the CN106 sends the packet 301 to the anycast address as the MN105 home address, that packet is conveyed in step 602 to a nearby HA101b according to the routing generally utilized in the IPv6 network.

When the HA101b receives the packet from the CN106 in step 603, a search is made in step 604 for the MN105 care-of address from the binding cache inside the HA101b.

In step 605, the MN105 care-of address is found. In other words, if the MN105 is already registered then the process shifts to step 608. If the MN105 is not registered, then the process shifts to step 606.

In step 606, the HA queries by communication 302 about HA with MN105 care-of addresses registered (as binding entries) in MS103 and for example obtains HA101a.

In step 607, the HA relays the packet 303 to the HA101a obtained in step 606.

When an MN105 care-of address was found in step 605, the HA sends the packet 404 loaded with a packet 30 addressed to the MN105 care-of address in step 608.

Figure 11:
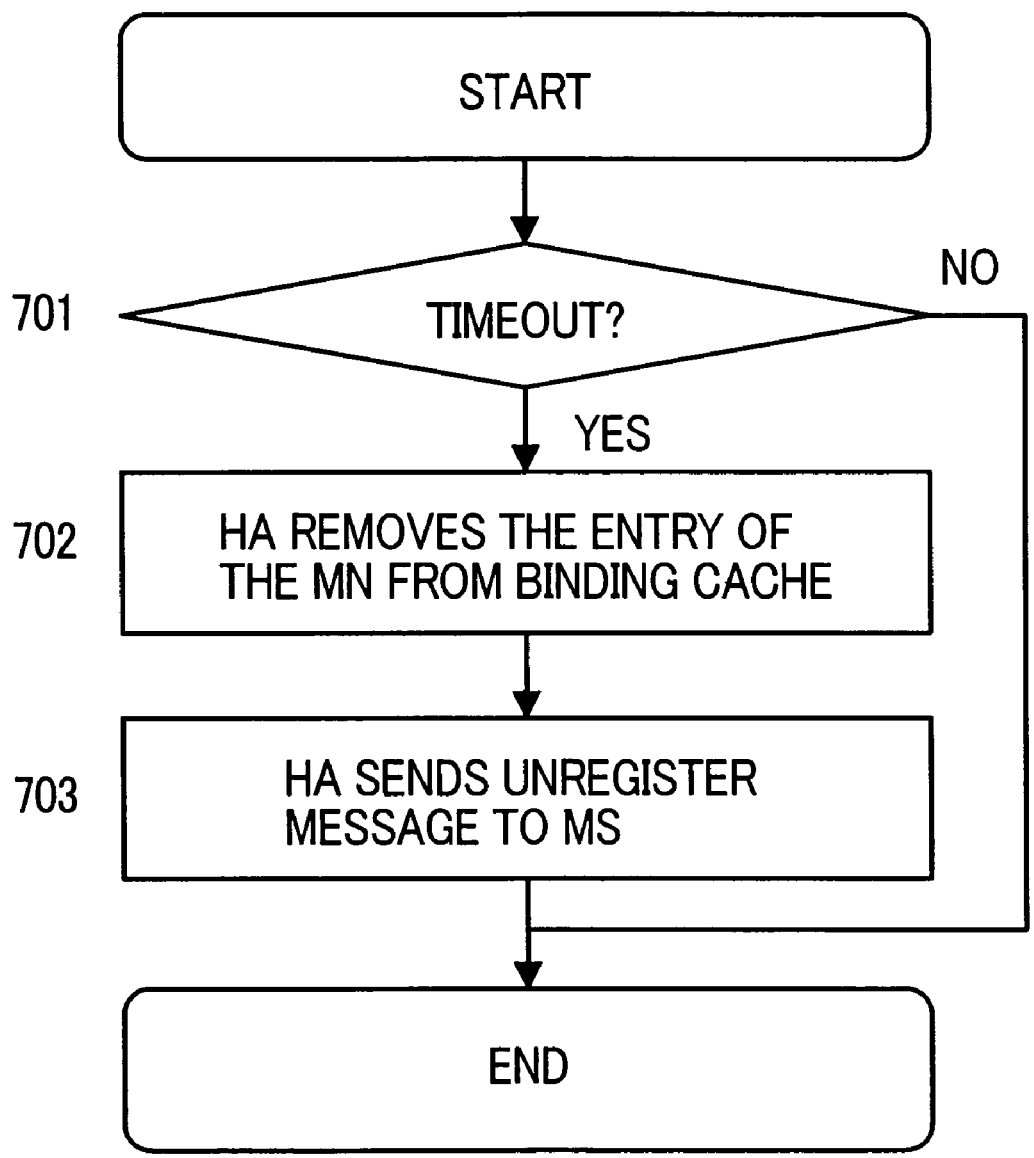
FIG. 11 is a flow chart showing the operation when unregistering (removing) each of the MN by timeout from the binding cache within the HA and from the link table within the MS.

FIG. 11 is a flow chart showing the operation when unregistering the respective MN from the link table within the MS and from the binding cache within the HA due to a timeout.

In step 701, a check is made if the new time that was set after renewing a binding cache entry has elapsed. If that time has elapsed then the process proceeds to step 702. If that time has not elapsed then the process terminates.

In step 702, the applicable entry is deleted, and the binding between the MN home address and the care-of address is deleted.

In step 703, the HA sends an unregister message to the MS, and the link between the MN and this HA is deleted from the binding list within the MS.

The steps 702 and step 703 are executed and the entry deleted, even in cases where the HA has received a clear unregister request via a binding request not specifying the care-of address from the MN. In this case, the accepting of an unregister request is notified by sending a binding acknowledgment to the MN.

Second Embodiment

Figure 12:
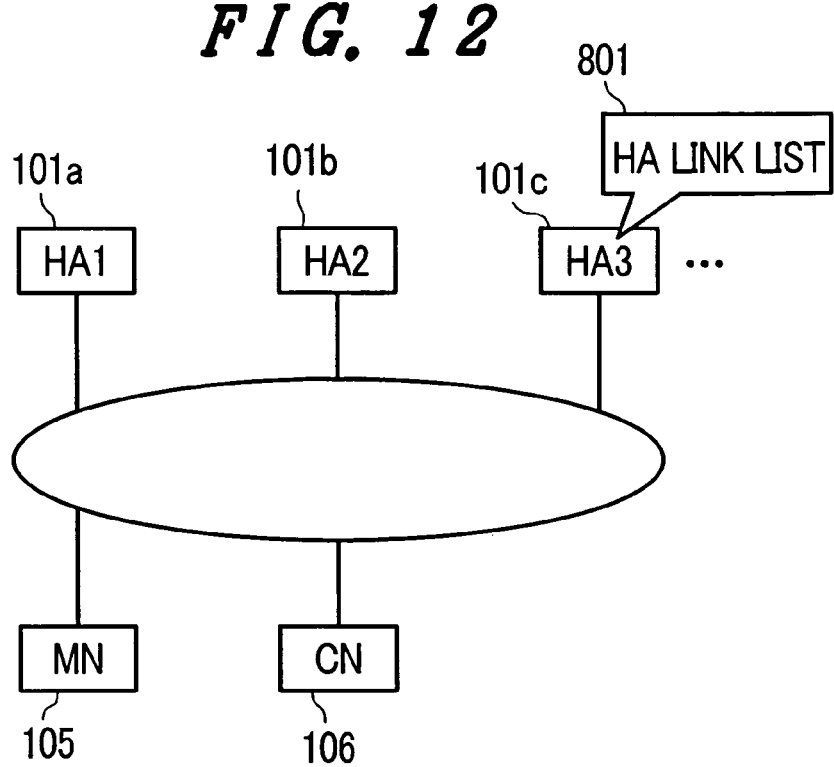
FIG. 12 is a network diagram showing another embodiment of the present invention.

FIG. 12 shows a block diagram of system not utilizing a master server.

This system is made up of one or more home agents (HA) 101a, 102b, 102c groups, and a mobile (MN) node 105, and one or more communication party nodes (CN) 106. Each HA includes a list (related HA list) for retaining the addresses of the other HA.

Figure 13:
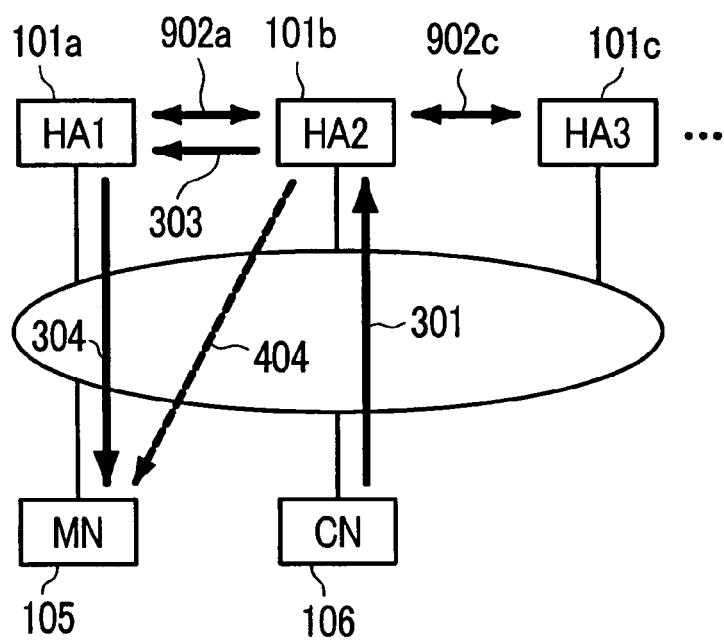
FIG. 13 is a network diagram for describing the operation of communication from the node to the mobile node.

The operation for communicating from the CN to the MN is described while referring to FIG. 13.

The CN106 sends a packet 301 to the home address of the MN105. The packet 301 is relayed to HA102b which is the nearby HA by a router group not shown in the drawing. When the HA102b receives the packet 301, it searches the binding cache within its own node for the MN105 care-of address. If results of the search are that no care-of address was registered then a query (communication 902a, 902c) is made to the HA (for example 101a, 101c) registered in the HA link list 801, about whether the MN105 care-of address is registered or not. If there is an MN105 care-of address registered in the HA101a, then the HA101b relays a packet (packet 303) to the HA101a, and the HA101a re-transfers that to the MN105 care-of address (packet 304) so that the packet is relayed from the CN106 to MN105.

When the MN105 care-of address is registered in the HA101b, the HA101b sends a packet 404 directly to the care-of address for MN105.

Figure 14:
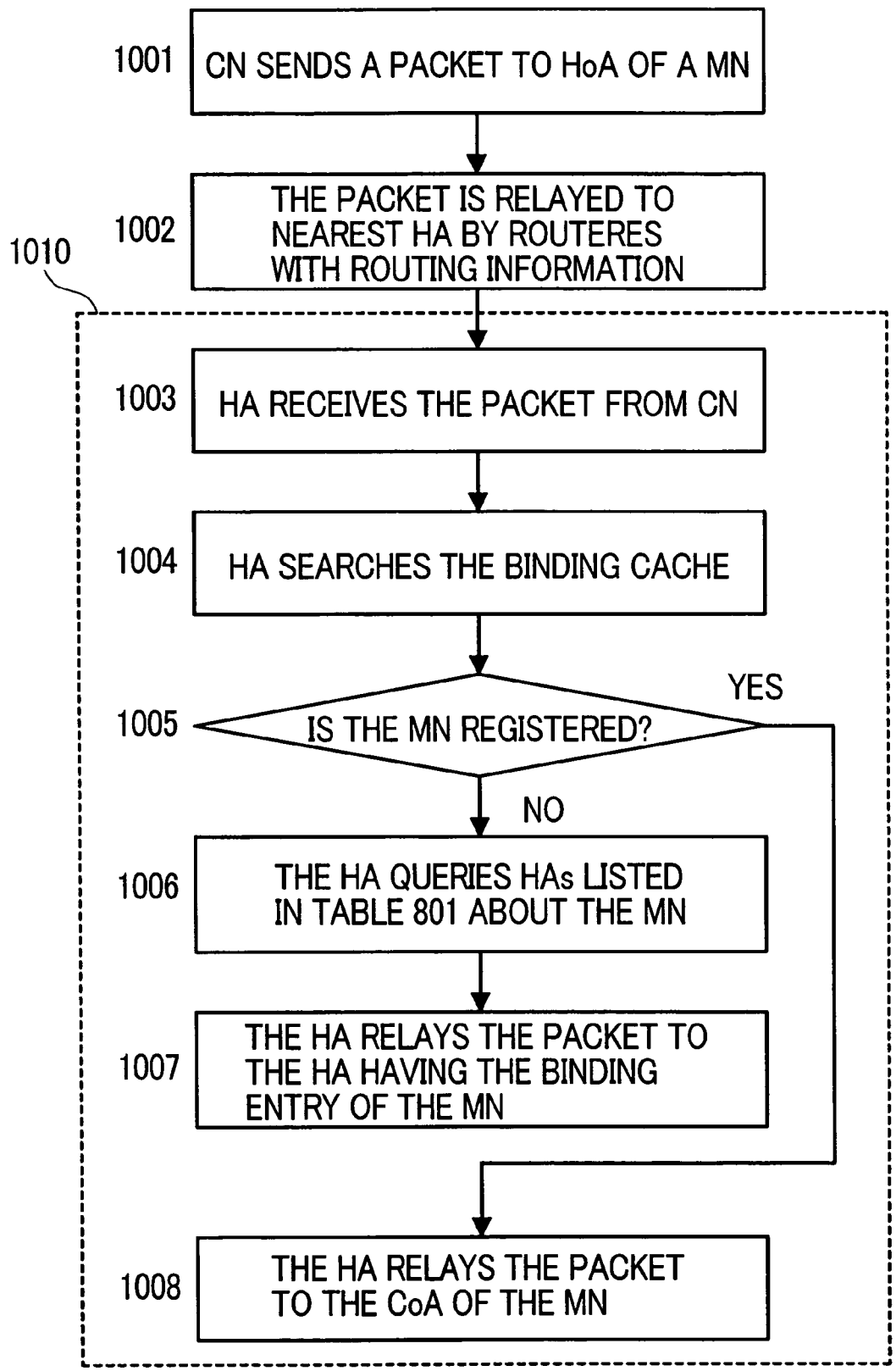
FIG. 14 is a flow chart showing the processing of the packet from the node in the home agent.

The processing of the packet from the CN in the HA is described next while referring to the flow chart in FIG. 14. Here, the group 1010 is the HA processing operation range.

In step 1001, when the CN106 sends the packet 301 to the MN105 anycast address as the home address, that packet is conveyed in step 1002 to a nearby HA101b according to the routing generally utilized in the IPv6 network.

When the HA101b receives the packet from the CN106 in step 1003, a search is made in step 1004 for the MN105 care-of address from the binding cache inside the HA101b.

In step 1005, the MN105 care-of address is found. In other words, if the MN105 is already registered then the process shifts to step 1008. If the MN105 is not registered, then the process shifts to step 1006.

In step 1006, the HA queries by communication 902a and 902c whether or not there are care-of addresses for MN105 registered in the HA101a and HA101c. The HA for example receives a positive reply from HA101a.

Here, information such as the number of hops to the MN and the delay are added to the reply. This information can be used as a reference for deciding which HA to utilize.

In step 1007, a packet 303 is relayed to the HA101a that returned a positive reply in step 1006.

Here, a nearby HA or an HA with a light load can be selected based on the information attached to the reply and the arrival time of the reply.

When a search was made for the MN105 care-of address in step S1005, the packet 301 is loaded in the packet 304 and sent in step 1008 to the MN care-of address.

Figure 15:
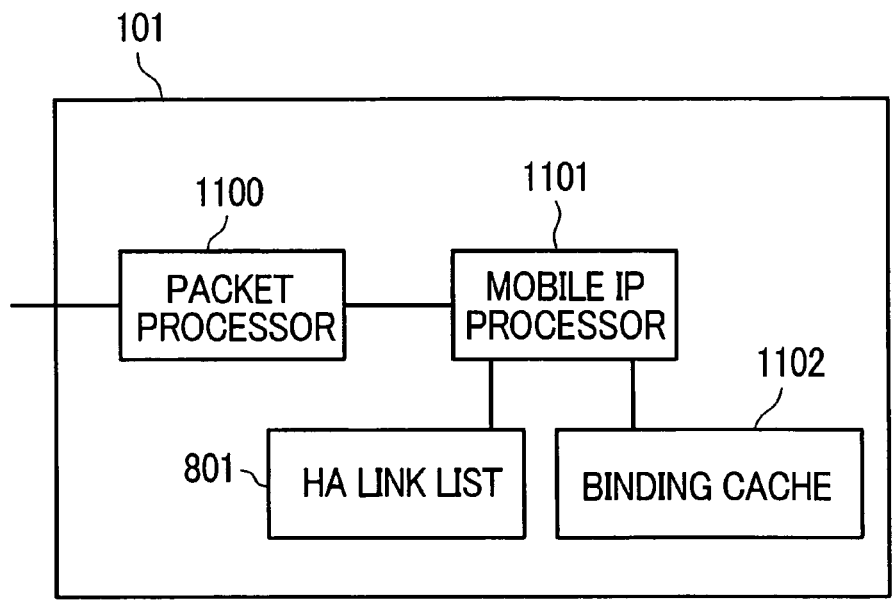
FIG. 15 is a block diagram showing the structure of the home agent.

FIG. 15 shows a typical structure of the HA in a system not utilizing MS. The HA01 includes a packet processor 1100, a Mobile IP processor 1101, a binding cache 1102 and an HA link list 801.

Figure 16:
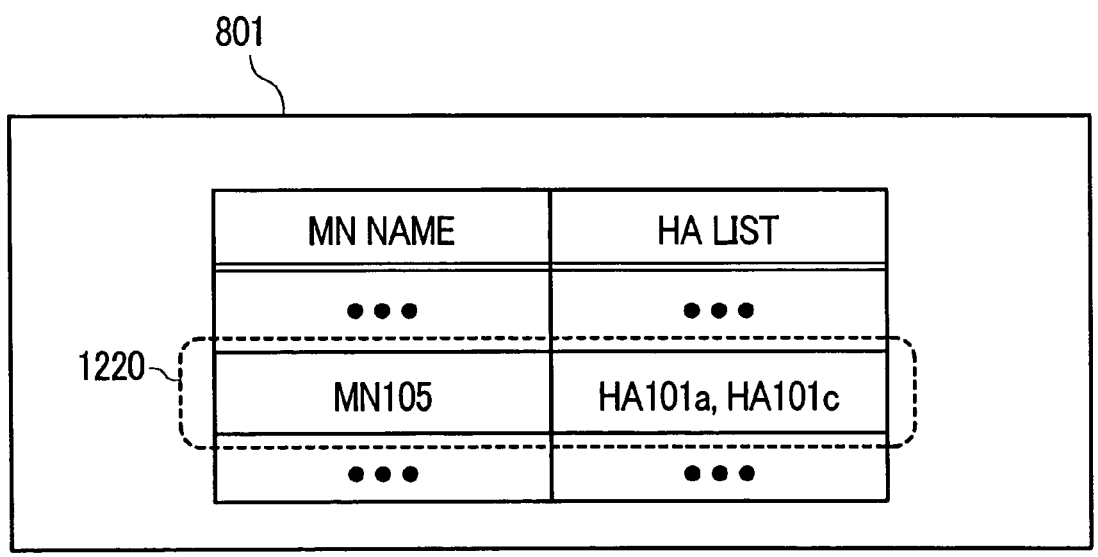
FIG. 16 is a table drawing showing the structure of the related home agent list.

FIG. 16 shows a typical structure of the HA link list 801. Each entry 1220 of the HA link list 801 contains the name of the MN (for example MN105) and the other HA storing the MN (for example, HA101a, HA101c).

The operation of the HA101 is described next using FIG. 15 and FIG. 16. When the packet processor 1100 of the HA101 receives a packet for MN105 from the CN106, it shifts the processing to the Mobile IP processor 1101. The Mobile IP processor 1101 searches the binding cache 1102 for entries corresponding to the MN105. When there are no matching (corresponding) entries in the binding cache 1102, the Mobile IP processor 1101 searches the HA link list 801 and obtains related HA (for example, HA101a, HA101c). A query is made to each HA about whether or not there are CoA (care-of addresses) registered for MN105. If there is CoA registered for MN105 in the HA101a, then a packet (packet 303) is relayed to the HA101a.

A network system can be rendered with a structure that is indispensable for communication with large numbers of mobile units such as automobiles because the communications are dispersed and relayed to multiple home agents.

What is claimed is:

1. A network control method for a network system for communicating with mobile nodes and utilizing two addresses comprised of a care-of address and a home address in a mobile node,
   wherein the method manages the matching of the care-of address with the mobile node home address, and utilizes a plurality of home agents in different networks for relaying packets from the mobile node and/or relaying packets to the mobile node,
   wherein the routing information is comprised of the home address as the anycast address of the mobile node, and
   wherein the routing information is comprised of the prefix of the home address as the anycast address.

2. A mobile network control method for a network system including a master server and a plurality of home agents, wherein the first home agent where the care-of address of the mobile node is registered, includes a step for registering that first agent and the mobile node in the master server, the mobile network control method, comprising:
   a step for the second home agent to receive a packet addressed to the home address of the mobile node;
   a step for the second home agent to search for the care-of address matching the mobile node;
   a step for querying the master server about the first home agent managing the mobile node, when there is no care-of address;
   a step for the second home agent to relay the packet to the first home agent; and
   a step for the first home agent to relay the packet to the care-of address of the mobile node.

3. A mobile network control method according to claim 2, wherein the mobile node that received communication relayed from the second home agent, registers the care-of address in the second home agent.

4. A mobile network control method which includes a plurality of home agents, comprising:
   a step for the second home agent to receive a packet addressed to the home address of the mobile node;
   a step for the second home agent to search for the care-of address matching the mobile node when there is no care-of address;
   a step for querying other home agents on whether there is a first home agent managing the mobile node;
   a step for the second home agent to relay the packet to the first home agent; and
   a step for the first home agent to relay the packet to the care-of address of the mobile node.

5. A network system connected by cable or radio with a first node, with the first node utilizing two addresses including a home address and a care-of address, said network system comprising:
- a plurality of home agents including a binding list for managing the matching of the home address and the care-of address; and
- a master server for managing the matching between the first node, and the home agent containing a binding list used by the first node,
- wherein the home address is an anycast address, and
- wherein during access of the first node by the second node connected to the network system, the second node issues a packet by an anycast address, and the issued packet is relayed to the first home agent that is one of the home agents by routing based on the anycast address, when the home agent does not contain a binding list used by the first node, the first agent queries the master server about home agents containing a binding list used by the first node.

6. A network system according to claim 5 wherein the issued packet is relayed to the first node from the first agent by way of the second home agent as a home agent containing a binding list used by the first node.

7. A network system according to claim 5, wherein after a flag is attached to the issued packet by the first home agent showing the route was via the first home agent, the issued packet is relayed to the first node via the second home agent as a home agent containing a binding list used by the first node.

8. A network system according to claim 7, wherein the first node that received the packet attached with a flag indicating the route is via the first home agent, registers the binding list used by the first node in the first home agent.

9. A server connected to a network system including a plurality of home agents containing binding lists for managing the matching of a care-of address with a home address of a mobile node, and utilizing the care-of address and the home address,
- wherein the server manages the matching of the node, and the home agents containing a binding list used by the node,
- the server has a mobile node—home agent link table, each entry in the mobile node—home agent link table is made up of information specifying the node, and a list of home agent groups where node care-of addresses are registered, and
- the server utilizes the plurality of home agents in different networks for relaying packets from the mobile node and/or relaying packets to the mobile node.

10. A server according to claim 9, comprising:
- a packet processor;
- an interrogator processor; and
- a memory, wherein
- the mobile node—home agent link table is stored in the memory, the packet processor includes a function to shift the processing to the interrogator processor when a packet query is received about home agents where care-of addresses for a specific node are registered, and
- the interrogator processor searches the list of home agents from the mobile node—home agent link table where the care-of address of the specified node is registered, and the interrogator processor contains a function to return a packet containing the list information to the source making the query.

11. A home agent connected to a network system including a node, and a master server, and containing a binding list for managing the matching between the home address of the node, and the care-of address, wherein the home agent comprises:
- a packet processor made up of an interface with an external section;
- a master server interrogator section for querying the master server;
- a mobile node—master server link table for managing the combining of information specifying a node and information specifying a master server;
- a mobile IP processor to search the binding list to find whether or not there is a care-of address matching the home address of the applicable node when a specified packet was sent from a specified node; and
- a master server interrogator to search the master server for the specified node from the mobile node—master server link table when results from searching the binding table show there is no care-of address, to query the searched master server for home agents registered with a care-of address for the specified node, and to relay the packet to another home agent.

* * * * *